United States Patent [19]
Jehanno

[11] Patent Number: 5,856,922
[45] Date of Patent: *Jan. 5, 1999

[54] PROCESS AND DEVICE FOR MEASURING THE TORQUE OF AN INTERNAL COMBUSTION HEAT ENGINE

[75] Inventor: Gilles Jehanno, Aubergenville, France

[73] Assignee: Regie Nationale Des Usines Renault, Boulogne-Billancourt Cedex, France

[ * ] Notice: The term of this patent shall not extend beyond the expiration date of Pat. No. 5,359,519.

[21] Appl. No.: 942,618

[22] Filed: Sep. 10, 1992

[30] Foreign Application Priority Data

Sep. 12, 1991 [FR] France ................................ 9111273

[51] Int. Cl.$^6$ ............................. G06G 7/70; F02D 41/00
[52] U.S. Cl. ............................. 364/431.061; 364/431.03; 364/431.04; 364/431.08; 73/116; 123/426; 123/672
[58] Field of Search ................... 364/431.01, 431.02, 364/431.03, 431.04, 431.05, 431.06, 431.07, 431.08, 424.1, 424.01, 431.061; 74/866, 867, 860; 123/305, 436, 350, 419, 425, 416, 417, 486, 672–674; 73/115, 116, 117.3, 118.1

[56] References Cited

U.S. PATENT DOCUMENTS

| | | | |
|---|---|---|---|
| 4,197,767 | 4/1980 | Leung ........................ | 74/860 |
| 4,357,662 | 11/1982 | Schira et al. ................ | 364/431.08 |
| 4,538,567 | 9/1985 | Grow ......................... | 123/305 |
| 4,545,346 | 10/1985 | Grow ......................... | 123/305 |
| 4,754,606 | 7/1988 | Nam ........................... | 60/616 |
| 4,936,277 | 6/1990 | Deutsch et al. ............... | 123/436 |

FOREIGN PATENT DOCUMENTS

9007051  6/1990  WIPO .

*Primary Examiner*—Kevin J. Teska
*Assistant Examiner*—Jacques H. Louis-Jacques
*Attorney, Agent, or Firm*—Oblon, Spivak, McClelland, Maier & Neustadt, P.C.

[57] ABSTRACT

This device applies to all internal combustion heat engines. It includes an electronic unit (10) associated with a ring gear (12) of the inertial flywheel and with sensor (22) with variable reluctance such as those used for electronic ignition engines. Instantaneous period $d_i$ of advancement of teeth (14–16) is produced (26–30–32–34). From signal $d_i$, period $T_4$ of the fraction of revolution of the flywheel corresponding to a period of the combustions is calculated (36) and stored (38). A magnitude $D'_4$, representative of a projection of the alternating component of the angular velocity of the flywheel at the frequency of the combustions is also calculated (40–42). A calculating stage (44) combines ($T_4$ and $D'_4$) with constants A and B suited to the type of engine for producing signals for measuring the average gas torque for each combustion of the gas mixture in the cylinders of the engine. This makes possible optimized settings and the detection of misfirings of combustion of passenger or industrial motor vehicles.

22 Claims, 1 Drawing Sheet

FIG. 1

PROCESS AND DEVICE FOR MEASURING THE TORQUE OF AN INTERNAL COMBUSTION HEAT ENGINE

BACKGROUND OF THE INVENTION

1. Field of the Invention

The invention relates to a process and a device for measuring the torque of an internal combustion heat engine and, more specifically, to a device for measuring the average gas torque per combustion, produced by such an engine during each combustion, in particular when it is mounted on a passenger vehicle or on a commercial vehicle.

2. Description of the Related Art

In an internal combustion heat engine, the torque produced is the resultant of many parameters and reflects the adequacy of their settings. It constitutes the output of a complex dynamic system. Its measurement is relatively simple and usual on a test-bed, but the cost of this measurement is relatively high. Further, the usual measuring beds deliver only the average values on several combustion cycles of the torque of the engine in stabilized operation. Such measurements of average values over a large number of combustions are insufficient in many respects, for optimizing certain settings of the engine or for diagnosing certain operating defects. Of these defects, detection and statistical evaluation of misfirings are necessitated by new international regulations.

To achieve the above objectives, the quantitative analysis of the average gas torque per combustion produced by the combustions of the gas mixture in the various cylinders of the heat engines is necessary. Such an analysis so far has been made only in the laboratory or on very high-power engines, and it generally relies on increases of pressure in the combustion chambers. This technique exhibits the major drawback of being able to be used only on engines designed (or specially modified) to make possible an installation of pressure sensors. In addition, it obviously is not immediately applicable to engines routinely mounted on a vehicle and, further, it remains so as long as the reliability, the cost, the life and the convenience of use of the pressure sensors are not in accordance with the economic requirements of the automobile industry.

In a PCT international patent application, filed by Motorola Inc. and published on Jun. 20, 1990 under No. WO 90/07051, an electronic control system of the operation of an internal combustion heat engine is described. This system is based on the concept that the instantaneous value of the advancement period of the teeth of a measuring ring gear, integral with the inertial flywheel of the engine, and in front of a stationary sensor, corresponds to the measurement of the instantaneous power output successively produced in each of the cylinders of the engine. The signal thus produced by the sensor is accordingly processed. This processing consists in: (1) measuring the instantaneous period $d_i$ for advancement of a tooth of the ring gear in front of the sensor, (2) respectively multiplying periods $d_i$ of the teeth relating to each of the cylinders by given weighting factors $P_i$ belonging to a sequence corresponding to a particular operating criterion of the engine such as pinging or power output (the procedure for determining these factors is not described), (3) adding results $d_i \cdot P_i$ obtained for each cylinder, (4) comparing this sum to a particular value taken as reference, (5) deducing, if necessary, from the result of this comparison the presence of pinging in a cylinder or a power imbalance of a cylinder relative to the others and (6) consequently modifying the supplying of the cylinder with an air-fuel mixture.

The object of the system thus described is to eliminate all pinging in the cylinders of the engine and/or to balance the instantaneous power outputs provided by each of them. As a result, the absolute value of the various intermediate magnitudes obtained is neither desired nor found.

SUMMARY OF THE INVENTION

An object of the present invention is, on the other hand, to use the signal produced by the sensor associated with the measuring ring gear of the inertial flywheel of the engine for calculating the absolute value of a single particular magnitude, characteristic of the overall operation of an internal combustion heat engine, namely average gas torque Cg, produced by each combustion of the gas mixture in each of the cylinders of such an engine.

Another object of the invention is to provide a device for measuring the average gas torque per combustion of internal combustion heat engines exhibiting the following characteristics: good precision at any speed and any load of the engine, great reliability, long life, ease of assembly, immediate use on a large number of engines installed in vehicles, small space requirement and low cost.

According to the invention, a device for producing a value or an electrical signal Cg, representative of the average gas torque produced by each combustion of the gas mixture in the cylinder or cylinders of an internal combustion heat engine, includes measuring reference points placed on a ring gear integral with the inertial flywheel of the engine, means for defining an indexing reference per flywheel revolution or per camshaft revolution for the reference points, an advancement sensor of the reference points, mounted stationary in the vicinity of the ring gear, and means for producing a primary signal representative of the period of advancement of each of the reference points in front of the sensor. According to the invention, it also includes means for processing this primary signal and thus for producing two secondary signals respectively representative of average angular velocity $\Omega_m$ of the reference points during a period of the combustions in the engine and, for the same period of the combustion, representative of projection $E \cos \phi$ on the phase reference line, groups of reference points respectively relating to the combustions in the various cylinders of the engine, of alternating component E of instantaneous angular velocity $\Omega_i$ of the reference points at the frequency of the combustions in the engine, and means for combining these two secondary signals, according to an equation:

$$Cg = -a \cdot \Omega_m \cdot E \cos \phi + b \cdot \Omega_m^2$$

and thus producing the desired signal, terms a and b being constants determined experimentally.

In the particular case of a four-cycle, four-cylinder gasoline engine which operates according to the four stroke cycle, each of the four periods of the cycle (intake, compression, combustion-expansion, exhaust) occurs during a particular half-revolution of the inertial flywheel integral with the crankshaft of the engine. The kinetic energy acquired by the system concerned (crankshaft, flywheel and alternating masses) is the result of various positive and negative instantaneous torques exerted on it during each of the different periods of the operation cycle of the engine.

Torque Cg, calculated by half-revolution in the special case above, is produced during the compression and combustion-expansion phases of the gas mixtures respectively trapped in two contiguous combustion cylinders. Since the engine is equipped with four cylinders in the case being considered, the other two cylinders are in intake and exhaust phases and it is possible to demonstrate as first approximation that they do not offset the value of Cg because of projection cos φ. Since the compression phases are less subject to variations, i.e., dispersions, than the combustion-expansion phases, it is possible to conclude that the value of Cg calculated on a half-revolution is that relative to the cylinder which was firing. It is also possible to conclude that torque Cg is an estimation of the average gas torque in the two phases, compression and combustion-expansion, of the same cylinder, therefore trapping the same gas mixture.

Regardless of the engine, Cg is, on the one hand, normally positive and, on the other hand, balanced by the sum of resistant average torques coming from variations of the rotary inertias of the engine, of various internal frictions in the engine, of intake vacuums and of exhaust excess pressures of the other cylinders and, of course, of the load, i.e., the vehicle.

The theorem of the kinetic energy teaches that the elementary variation of the kinetic energy of a system equals the elementary work of the torques to which it is subjected. By applying this theorem to the system concerned, namely the crankshaft, the inertial flywheel and the alternating masses involved, and by assuming that the crankshaft-flywheel unit is rigid, wing a harmonic analysis of the result obtained, the load placed downstream from the inertial flywheel being considered as totally uncoupled for the frequency being considered, it is demonstrated that the alternating component Ca of the gas torque at the frequency of the combustions in the engine is linked to average angular velocity $\Omega_m$ of the inertial flywheel and to the projection, on a phase reference line, of alternating component E of instantaneous angular velocity $\Omega_i$ of this flywheel, at the frequency of the combustions of the engine, by the following linear equation:

$$Ca = -a_1 \cdot \Omega_m \cdot E \cos \phi + b_1 \cdot \Omega_m^2$$

in which $a_1$ and $b_1$ are two constant terms, the first proportional to the rotary inertia of the engine, and the second a function of the moment of inertia of the alternating masses and, in some cases of measurement, irregularities of position of the reference points of the measuring ring gear.

Further, an experimental study on the test-bed of several internal combustion heat engines has shown that the Cg/Ca ratio of average value Cg of the gas torque and of alternating component Ca of the same gas torque varies little for the various speeds and for the various operating loads of the engine concerned, especially since richness (r) of the gas mixture is constant or greater than or equal to one unit.

Consequently, the experimentation and the calculation for a rigid crankshaft-flywheel system have made it possible to produce the equation $$Cg = -a \cdot \Omega_m \cdot E \cos \phi + b \cdot \Omega_m^2$$

which is the basis of the design of the measuring device according to the invention for the low speeds of the engine.

In the case of high operating speeds of the engine, this basic equation must, however, undergo a correction. Actually, at high speed, the torsional elasticity of the enging linkages, particularly the link comprised by the crankshaft and the inertial flywheel of the engine, exhibit a frequency transfer function which modifies vector E which is representative of the basic alternating component of the instantaneous angular velocity of the flywheel at frequency fi of the combustions in the engine. Since the links have insignificant damping, the transfer function can be written $Z=1+(fi/fr)^2$, term fi being the combustion frequency proportional to rotation frequency fv of the flywheel ($fi = fv \cdot 2k/t$) with, as will be seen below, k being the number of cylinders and t the number of periods of the operating cycle of the engine and fr the frequency of mechanical resonance of torsion of the crankshaft/flywheel link. In practice, this frequency fr is equal to four to six times the maximum rotation frequency in Hertz of the engine, so that term $z=(fi/fr)^2$ relative to combustion frequency fi will often be low and so that a simple correction factor $(1-z)$ can be applied to constant "a" of the basic equation referred to above, so that calculated value Cg is corrected for the "crankshaft/flywheel torsion" effect.

In practice, the measuring ring gear integral with the inertial flywheel and its associated sensor with variable reluctance, currently used on standard electronic ignition engines, is perfectly suitable. In this connection, however, it will be noted that a Hall effect sensor can also be used with a measuring ring gear and that the reference points of the measuring ring gear can be reflective facets and the associated sensor can be of an optoelectronic type.

In this way, the elements pertaining to the device for measuring torque Cg according to the invention are reduced to electronic circuits for processing signals and for calculation, of usual type and having small space requirements, which could very simply be connected to an existing piece of equipment (the sensor) and be separated or at least partially integrated in the microprocessor or in one of the microprocessors which equip the electronic control computer of the engine or of the vehicle. Further, with regard to the functions of the circuits in question, it will be noted from now on that simple processing of the initial measuring signal delivered by the stationary sensor placed in front of the flywheel makes it possible to produce, without particular difficulties, primary signal or value $d_i$ and secondary signals or values $\Omega_m$ and E, used in the invention.

Thanks to the device according to the invention, it now becomes technically and economically possible to equip most standard passenger vehicles and most standard commercial vehicles with means for measuring average gas torque Cg, produced by each combustion of a gas mixture in the cylinders of the engine and to use them to improve continuously the operation of the engine and to monitor their defects and thus facilitate the use of the new standards relative to the composition of the exhaust gases and to the diagnoses concerning them. Such an on-board torque measuring device was desired for several years by most manufacturers but was not achieved until now in an economic way.

The invention also relates to a process for producing a value representative of average gas torque Cg produced by each combustion of the gas mixture in the cylinders of an internal combustion heat engine, said engine being of the type having measuring reference points placed on a ring gear integral with the inertial flywheel of the engine, means for defining an indexing reference of the reference points, and a sensor of advancement of the reference points, mounted stationary in the vicinity of the ring gear.

The process includes (a) production of a primary value representative of the period $d_i$ for advancement of each of the reference points in front of the sensor; (b) processing of said primary value $d_i$ for producing two secondary values respectively representative of average angular velocity $\Omega_m$ on the reference points during a period of the combustions in the engine, and representative of projection E cos φ on the phase reference line of the reference points relating to the angular combustion periods of alternating component E of instantaneous angular velocity $\Omega_i$ of the reference points at the frequency of the combustion in the engine; and (c) combination of these two secondary values according to an equation:

$$Cg = -a \cdot \Omega_m \cdot E \cos \phi + b \cdot \Omega_m^2$$

and thus obtaining the desired value, terms a and b being constants determined experimentally.

In the case where Cg is a digital value and the internal combustion heat engine operates with t periods per operating cycle and k cylinders and the number of real or virtual measuring reference points is n, operation (b) comprises the operations:

(b1) calculation from $n_c$ primary digital values $d_i$ of a first secondary digital value $T_k$ representative of the total period of advancement in front of the sensor of each series of $n_c$ reference points relating to the angular period of a combustion in the engine $$\text{with } n_c = (n \cdot t)/(2 \cdot k) \text{ and } T_k = \sum_{o}^{(n_c-1)} d_i$$

(b2) calculation from $n_c$ primary digital values $d_i$ and from weighting factors $\cos(i \cdot 2\pi/n_c)$ of a second secondary digital value $D_k \cos \phi'k$ representative of the projection, on a phase reference line of the reference points corresponding to the origin of the angular periods of the combustions, of the amplitude of the alternating component of instantaneous periods $d_i$ of advancement in front of the sensor of the measuring reference points, at the frequency of the combustions in the engine, with $$D_k \cos \phi'_k = (2/n_c) \cdot \sum_{o}^{(n_c-1)} d_i \cdot \cos(i \cdot 2\pi/n_c).$$

Further, operation (c), for an engine operating at low speed, consists in:

(c1) calculating desired digital value Cg, defined by the equation $$Cg = A \cdot (D_k \cos \phi'_k)/T^3_k + B/T^2_k = A \cdot D'_k/T^3_k + B/T^2_k$$

from two secondary digital values $D_k \cos \phi'_k$ and $T_k$ and from two constants A and B that are experimentally determined and recorded.

Further, the process can comprise additional operations for performing corrections as a function, in particular, of richness r, of the recirculation rate of the exhaust gases, of the operation at high speed of the engine or in speed transition.

BRIEF DESCRIPTION OF THE DRAWINGS

The characteristics and advantages of the invention will come out more precisely from the description of a particular embodiment of the invention, given below by way of nonlimiting example, with reference to the accompanying drawing in which The single FIGURE is a diagram of the various constituent elements of the device according to the invention.

DETAILED DESCRIPTION OF THE INVENTION

Figure 1:
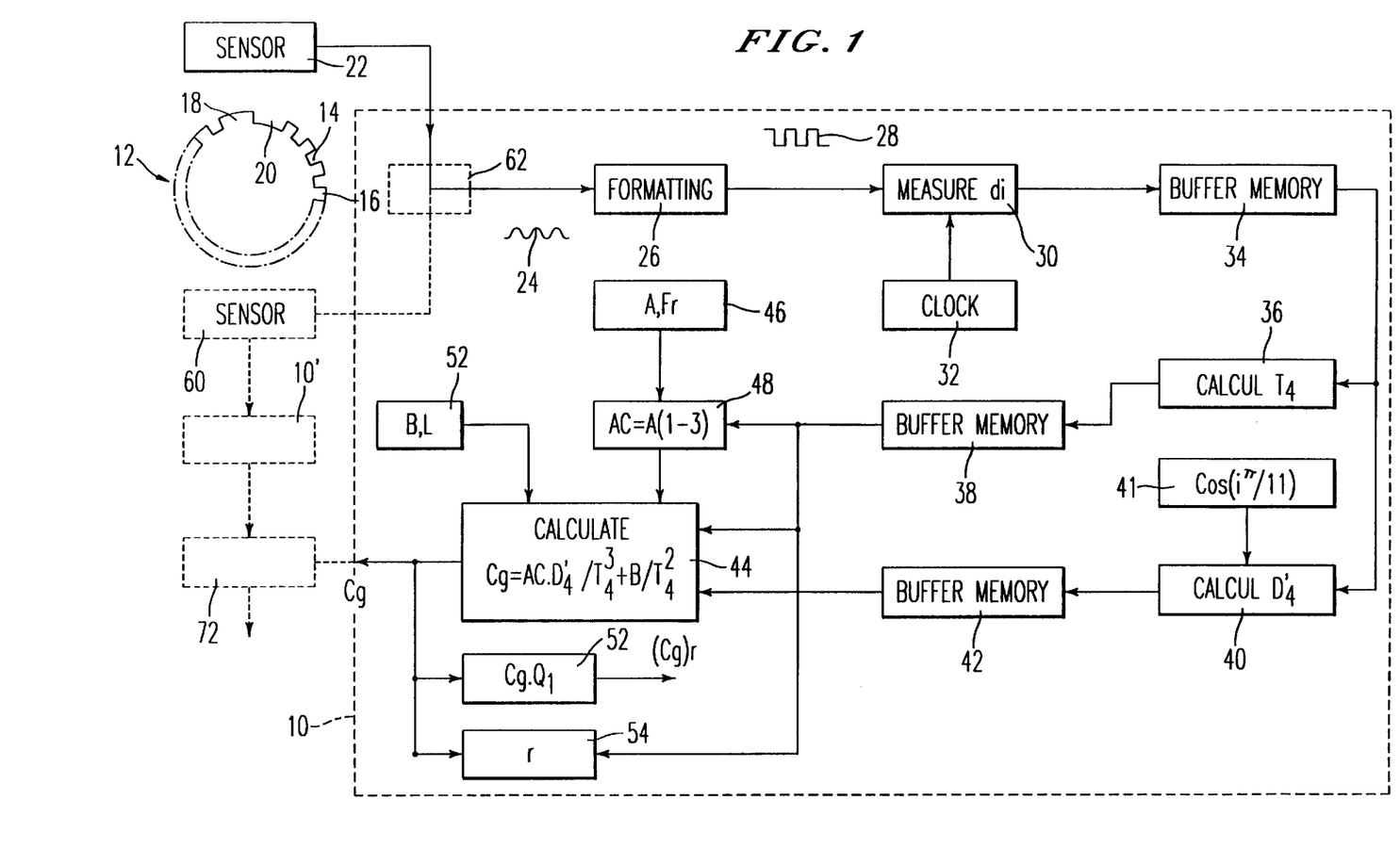

In the single FIGURE is represented circuit 10 for measuring average gas torque Cg, produced by each combustion of the gas mixture in a heat engine with four cycles (t=4) and four cylinders (k=4), equipped with a measuring ring gear 12, integral with the inertial flywheel, for example, the ring gear of standard type mounted on electronic ignition engines.

By way of example, ring gear 12 comprises on its periphery thirty-eight identical teeth (a tooth being defined as a transition between a projection and a recess), such as those referenced 14 and 16, which are distributed in two series of nineteen teeth separated by two reference teeth, such as those referenced 18 and 20, which are at diametrically opposite positions and which have a width triple that of the other teeth. In fact, the ring gear comprises:

n=2×19+2×3=44 equidistant reference points called real or virtual teeth of the same module, of which two are diametrically opposite to serve as reference or as indexing origin, making it possible to number the teeth and, in particular, to determine tooth do which will be defined below.

A stationary sensor 22, for example with variable reluctance, suitable for delivering an alternating signal 24 of frequency proportional to the advancing speed of the teeth of the ring gear, i.e., proportional to the instantaneous speed of the flywheel, is associated with ring gear 12.

The angular position of this sensor 22 relative to indexing teeth 18 when the piston is at top dead center is known or determined, which makes it possible to determine tooth $d_o$ as being that which advances in front of the sensor during the passage of the piston of the cylinder concerned to its top dead center of combustion.

The signal, delivered by sensor 22, is applied at the input of a formatting circuit 26, suitable for delivering substantially square wave signals 28 of a period equal to instantaneous period $d_i$ of incident signals 24, index i varying from 0 to 21 as the teeth advance in front of the sensor. Each period $d_i$ of the signal thus produced corresponds to the period of passage of one tooth, i.e., a transition between an outwardly projecting tooth and an inwardly projecting tooth, in front of sensor 22. With regard to the incident signals produced by indexing teeth 18, formatting circuit 26 transforms them in the same way into a steep-side signal, of a period approximately triple that of the signals relating to the other teeth (14, 16). Signals 28 are applied to a stage 30 for measuring and for calculating instantaneous periods $d_i$ of advancement of the real and virtual teeth of measuring ring gear 12 in front of sensor 22.

For this purpose, by way of embodiment of stage 30, a counter continuously receives chronometric pulses of high frequency (1 to 20 MHz, for example), produced by a quartz clock 32, for example, and it delivers as output digital values representative of the numbers of clock pulses counted, therefore of the "date" (overflow module of the counter) of each hollow-solid transition of the steep-front signals, produced by formatting stage 26. This counter alternately transmits the "date" $t_{i-1}$ that it contains to a first register and a following date $t_i$ to a second register. These two registers are followed by a calculating stage suitable for calculating period $d_i = (t_i - t_{i-1})$ of index tooth i and for addressing its result to a buffer memory 34. In this way, no clock pulse is lost and the measuring error of periods $d_i$ is minimized.

With regard to the processing of each signal 28 produced by one of long indexing teeth 18, 20 within the framework of the example described, its value will be divided by three and the result assigned to three corresponding virtual teeth while, if necessary, taking into account the remainder. In this way, stage 30 for measuring and calculating periods $d_i$, addresses to buffer memory 34 successive series of $n_c = n/2$ (or 22 in the case of the example described) digital values $d_i$, respectively associated with n/2 weighting coefficients contained in a permanent memory 41 and defined by row i of the real or virtual tooth concerned.

In the case of the four-cycle and four-cylinder engine of the example, with each half-revolution of the flywheel, the digital values contained in buffer memory 34 are updated. Values $d_i$, thus stored in 34 at the end of a half-revolution of combustion-expansion (in the example described), are applied to a calculating stage 36, suitable for calculating period $T_4$ (index 4 corresponds to four combustions per cycle) of each half-revolution of the flywheel, in keeping with the equation $$T_4 = \sum_{o}^{21} d_i$$

Last digital value $T_4$ calculated in stage 36 is applied to a buffer memory 38 and it remains there until it is replaced by the next. The average angular velocity of the inertial flywheel during the combustion-expansion phase which was just completed is $\Omega_m = \pi/T_4$.

Values $d_i$ stored in 34 are also applied to another calculating stage 40, suitable for performing, in digital form, a synchronous angular detection of a projection designated $D_4 \cos \phi'4$ of the basic alternating term of $d_i$, added to a phase reference position consisting of first index tooth i=0 or $d_o$ of the series of n/2 =22 teeth assigned to a given cylinder. To do this, stage 40 is suitable for calculating:

$$D_4 \cos\phi'_4 = (1/11) \cdot \sum_{o}^{21} d_i \cdot \cos(i\pi/11)$$

and for applying it to a buffer memory 42.

The n/2 weighting factors (or 22 in the example described) of the above-mentioned expression consist of the eleven values successively taken twice, but with opposite signs, by term $(\cos i \cdot \pi/11)$ when row i of the tooth concerned varies from 0 to 10 then from 11 to 21. These values are stored in permanent memory 41, associated with calculating stage 40. Term $\delta\theta$ being the nominal angular pitch of the teeth of measuring ring gear 12 (in the example described here $\delta\theta = \pi/22$), instantaneous angular velocity $\Omega_i$ of the flywheel is $\Omega_i = \delta\theta/d_i$. The value projected on the reference axis of basic alternating component $E_4$ of $\Omega_i$ is:

$$E_4\cos\phi_4 = (1/11) \cdot \sum_{o}^{21} \Omega_i \cdot \cos(i\pi/11)$$

By replacing $\Omega_i$ with its value $\delta\theta/d_i$ and by taking into account the fact that $d_i$ varies little around its average value $d_m = T_4/22$ in the example, it is shown that:

$$E_4 \cos \phi_4 = -(\Omega^2_m/\delta\theta) \cdot D_4 \cos \phi'_4$$

and that:

$$Cg = -a \cdot \Omega_m \cdot E_4 \cos \phi_4 + b \cdot \Omega^2_m$$

If teeth ($\delta\theta_i$) are not placed uniformly on the ring gear, it is demonstrated that there will appear a term proportional to $\Omega_m$ in $E_4 \cos \phi_4$ but this term is not troublesome because its influence in Cg will be proportional to $\Omega^2_m$ and can be compensated by modifying the value of coefficient b.

In this way, if two terms $d_i$ and $\Omega_i$ are broken down in Fourier series and if a synchronous detection of a projection of their basic alternating component is made in digital form, $D \cos \phi'$ and $E \cos \phi$, which are two dependent variables, will be obtained. In the example described of a four-cycle and four-cylinder engine, there are two combustions per flywheel revolution and therefore four combustions per operating cycle of the engine, which is recalled by the index 4 used, the alternating component of value $E_4 \cos \phi_4$ of $\Omega_i$ is connected to the alternating component of value $D_4 \cos \phi'_4$ of $d_i$ by the equation $$E_4 \cos \phi_4 = -\Omega^2_m \cdot (22/\pi) \cdot D_4 \cos \phi'_4$$

As the above-mentioned experimental study showed for the low speeds of the engine,
$Cg = -a \cdot \Omega_m \cdot E'_4 + b \cdot \Omega^2_m = a \cdot \Omega^3_m \cdot (22/\pi) \cdot D'_4 + b \cdot \Omega^2_m$ by assuming $E'_4 = E_4 \cos \phi_4$ and $D'_4 = D_4 \cos \phi'_4$
Since $\Omega_m = \pi/T_4$,
$Cg = A \cdot D'_4/T^3_4 + B/T^2_4$
which is the expression sought with $$T_4 = \sum_{o}^{21} d_i \text{ and } D'_4 = (1/11) \cdot \sum_{o}^{21} d_i \cdot \cos(i\pi/11)$$

terms A and B being constants pertaining either to the engine concerned, or to all those of its type.

In practice, these constants A and B are determined by a measurement of the torque of the engine at two particular points or optionally by a statistical analysis (method of least error squares) of a large number of measurements made in the laboratory on a reference engine, according to the series of engines for which the torquemeter model according to the invention is intended. According to the above, within the framework of the example described, magnitudes $T_4$ and $D'_4$, respectively produced in calculating stages 36 and 40, are, at the end of each half-revolution of the inertial flywheel of the engine, synchronized by at least one indexing tooth per engine cycle, applied to a calculating stage 44 which produces Cg from these two input magnitudes $T_4$ and $D'_4$ and constants A and B stored for this purpose, term A being previously corrected before use to be applicable at high speeds of the engine.

Actually, as has been indicated above, the above equation $Cg = A \cdot D'_4/T^3_4 + B/T^2_4$ is valid, strictly speaking, only for the low speeds of the engine. For the high speeds, a correction of term A is necessary. To do this, in the case of a ring gear 12 integral with the inertial flywheel, an additional calculating stage 48 is provided which produces a corrected term $Ac = A(1-z)$ with $z = (fi/fr)^2$, from the value of A stored in a permanent memory 46, of value $T_4$ provided by buffer memory 38 ($fi = 1/T_4$ =half-revolution frequency, in the example described) and a term fr (resonance frequency in torsion of the crankshaft/flywheel link) also stored in memory 46. Corrected term Ac is applied to computer 44 which receives $T_4$ from buffer memory 38, B from permanent memory 50 and $D'_4$ from buffer memory 42, and which calculates the average gas torque on a half-revolution, according to the equation, valid at all speeds of the engine:

$$Cg = Ac \cdot D'_4/T^3_4 + B/T^2_4$$

To obtain a more precise estimation of Cg, coefficients A and B can be identified by the engine operation zone; they can also be made dependent on engine settings, for example, richness r.

But another method is to keep A and B constant, which makes it possible to obtain a first rough value of Cg, then, either to cause a correction mapping (of additive type) or to apply corrective terms to refine the value of Cg. Some practical correction examples will be described below.

In the case of an engine operating with a lean mixture (fuel/air richness, r<1) with r not constant, calculating stage 44 which provides Cg is, if necessary, followed by an additional calculating stage 52 which calculates the corrected value of Cg as a function of this richness r, when r<1. In this case, the values of r as a function of the speed of the engine deduced from $T_4$ and of produced torque Cg can be measured by a sensor provided for this purpose or even having been determined in the laboratory, and their mapping for each type of engines concerned (diesel, in particular), stored in a permanent memory 54. As a function of values $T_4$ and Cg addressed to memory 54, value r to be considered is entered in calculating stage 52 if r<1. The latter first determines a correction factor $Q_1=[1+p_1(r-1)]$, with $p_1$ close to +0.5, then assigns Cg to it to produce a measurement $(Cg)_r=Cg \cdot Q_1$, corrected by factor $Q_1<1$, as a function of richness r of the mixture when r<1.

The various stages of calculation described in relation to the single FIGURE, as their use in the process is described, consist of a microprocessor operating under the control of an application software L developed for this purpose and contained in permanent memory 50. Another method is, of course, to perform at least one part of the operations provided, by means of an analog computer whose various stages each provide a particular function.

All the circuits represented can be made in the form of an integrated circuit or hybrid circuit, specific to the problem to be solved.

In addition to what has been stated above, the crankshaft/flywheel elastic link causes, at high speed of the engine, a bending error. Actually, at high speed, the inevitable offsetting of the center of gravity of the flywheel, relative to its theoretical axis of rotation, causes a significant periodic variation of the width of the air gap located between the head of sensor with variable reluctance 22 and the teeth of measuring ring gear 12. In this case, the amplitude of alternating signal 24 delivered by sensor 22 varies and the switching thresholds of formatting stage 26 no longer correspond to given angular positions of these teeth, which causes an additional variation of periods $d_i$ during each flywheel revolution. To compensate for such a variation, several solutions are available.

One will be to use a sensor less sensitive to this bending such as the Hall effect or optoelectronic sensors.

Another, imposed by the number of vehicles currently equipped with a sensor with variable reluctance, will be to perform a mapping correction.

Another also will be to mount a compensation sensor 60 identical to initial sensor 22 and diametrically opposite it, in the case of an engine having two combustions per flywheel revolution. In this case, the analog signals delivered by the two sensors will preferably be added in a stage 62 before being applied to formatting stage 26.

Another solution will be to process separately the signals thus provided by the sensors with variable reluctance and, at the end of the chain, to take the average of results Cg obtained.

In the example described above, the engine concerned is a four-cycle and four-cylinder gasoline engine and the number of real or virtual reference points of the measuring ring gear is 44. The invention, of course, is not limited to this particular example. It actually relates to all internal combustion heat engines regardless of type: four-cycle, two-cycle, gasoline, diesel or any other fuel and regardless of the number of cylinders or the number of reference points of the measuring ring gear provided that $n_c \geq 2$.

If the number of periods per operating cycle of the engine is designated by t, the number of its cylinders by k and the number of real or virtual reference points of the measuring ring gear of the inertial flywheel by n, the number of reference points which corresponds to each of angular periods ($\pi t/k$) of the combustions in the engine and which will be taken into account for the synchronous angular detection of the instantaneous angular velocity at the frequency of the combustions is $n_c=n \cdot t/(2 \cdot k)$, which provides combustion by combustion and therefore cylinder by cylinder:

$$T_k = \sum_{o}^{(n_c-1)} d_i.$$

Under these conditions, the term:

$$D_4 \cos \phi'4 = (1/11) \cdot \sum_{o}^{21} d_i \cdot \cos(i \cdot \pi/11) = D'_4$$

mentioned above is written in the generalized form:

$$D_k \cos \phi'_k = (2/n_c) \cdot \sum_{o}^{(n-1)} d_i \cdot \cos(i \cdot 2\pi/n_c) = D'_k$$

Further, a possibility for compensating the measuring error due to the cyclic bending at high speeds of the engine of the crankshaft-inertial flywheel elastic link in the case of an engine with t periods per operating cycle and with k cylinders, provided with sensors with variable reluctance, the total number of these sensors will be M=2k/t. These sensors will be approximately identical and placed uniformly around ring gear (12), their output signals being in a first embodiment added in a circuit 62 provided for this purpose, before application to formatting stage 26.

In a second embodiment, necessary, for example, in the case of a measuring ring gear with a single indexing tooth per revolution of the crankshaft, the signals delivered by each of the sensors are processed by a measuring circuit 10 and results Cg obtained are averaged to provide a corrected measuring signal Cg. Such a solution is represented in the single FIGURE by the application of the output signal of sensor 60 to a device 10', identical to device 10, whose output value C'g is applied to an algebraic average circuit 72 which further receives value Cg corresponding to sensor 22.

It will be noted that one or the other of these two solutions makes it possible to compensate for the error resulting from the air gap variations of the sensor with variable reluctance, variations which are produced at high speeds by the bending of the crankshaft/flywheel link.

To optimize the electronic control of the operation of the engines, number n of measuring reference points can be relatively large. In such a case, separately taking into account each of these reference points for calculating $D_k \cos \phi'_4$ would lead to a high number of mathematical operations for the calculating stage concerned and therefore would necessitate a relatively powerful microprocessor. By application of the Shannon theorem on the minimal number of periodic samples which defines a sinusoidal signal, namely, two samples, it will be advantageous to combine advancement periods $d_i$ of the various reference points into a whole number of bundles, for a combustion period of the engine, equal to this minimum number plus one or two.

In the case of the most general combination, calculating stage 30 will no longer have as its function to calculate advancement period $d_i$ of each of the reference points in front of the sensor, but that $d_p$ of each of the bundles or reference points which will be constituted. This will make it possible, for example, with an actual number of bundles equal to m=4, to write when the number of reference points n is relatively high:

$$D'_k = \frac{1}{2} \cdot \sum_{o}^{3} d_p \cdot \cos(p \cdot \pi/2) = D_k \cos\phi'_k$$

term p here being the rank of the bundle of reference points to be taken into account, it being understood that a bundle can comprise a whole number or a fraction of reference points. With this combination of the bundles of reference points, bundle p=0 is that which contains tooth $d_o$, i.e., the top dead center.

The device for measuring the average gas torque per combustion of the gas mixture in the cylinders of an engine which was just described with its different variants and its particular correction means is suitable to provide satisfactory results for the stabilized speeds of the engine.

In the case of transition speeds, an additional correction is necessary for taking into account the dynamic error which then affects the expression of term $D_k \cos\phi'_4$ calculated by stage 40 of circuit 10. This error falls as the number of teeth of the measuring ring gear rises. Good results are obtained, with the ring gear of 44 teeth described, when the transitions are not too violent.

In the case of strong transitions, in particular for the no-load engine accelerations, these results can be improved with a corrective term added to the expression of $(D_k \cos\phi'_k)$ defined above. This term which, of course, has a zero average in the case of a stabilized speed, relies on the last two calculated values of period of the combustions $T_k$ in the k cylinders of the engine, namely $T_{k,e}$ and $T_{k,(e-1)}$. In this way, by not making the cosines of $D_k \cos\phi'_k$ appear:

$$(D'_k)\text{corrected} = D'_k + \frac{1}{n_c} \cdot \frac{T_{k,e} - T_{k,(e-1)}}{n_c}$$

The correction is greater for a smaller number of teeth $n_c$ or of bundles of reference points m, per angular combustion period $\pi t/k$.

The calculation of $(D'_k)$corrected is performed by calculating stage 40, programmed for this purpose.

The invention is also not limited to the method of calculation of $D_k \cos\phi'_k$ which was described above, a method in which $d_i$ is weighted by the cosine of angle $M \cdot \theta_i$, $\theta_i$ being the position of the beginning of the reference point (beginning of tooth or steep front) such that:

$$D_k \cos\phi'_k = (2/n_c) \cdot \sum_{o}^{(n-1)} d_i \cdot \cos(M \cdot \theta_i)$$

knowing that M=2k/t, that $\theta_i = i \cdot 2\pi/n$ and that $n_c = (n \cdot t)/(2 \cdot k)$: $M \cdot \theta_i = (2k/t) \cdot (i \cdot 2\pi/n) = (i \cdot 2k)/(nt \cdot 2\pi) = i \cdot (2\pi/n_c)$ is obtained.

It is possible to select any angular position inside the reference point (or the tooth), which leads to the more general formula:

$$D_k \cos\phi'_k = (2/n_c) \cdot \sum_{o}^{(n_c-1)} d_i \cdot \cos(i \cdot 2\pi/n_c + \epsilon \cdot 2\pi/n_c)$$

with $0 \leq \epsilon < 1$.

It should be noted that the correction of speed transition which was described above must be suited to the choice of constant $\epsilon$ if $\epsilon$ is different from zero.

Value $\epsilon$=0.5 offers the advantage that there is no correction of speed transition to be performed because vector $\delta\Omega_k$, generated by the speed transition, is then perpendicular to the projection axis used for the calculation of $D_k \cos\phi'_k$.

This feature makes it possible to prevent a corrective calculation for uses of strong transitions in the case of a ring gear equipped with a small number of reference points or in the case of combinations of reference points by bundles.

It should be noted that the cos $(i \cdot 2\pi/n_c)$ weightings can be coded in memory 41 on eight binary numbers (8 bits) without an effect on the accuracy of $D_k \cos\phi'_k$, with its only constraint that the average value of $$\sum_{i=0}^{(n_c-1)} \cos(i \cdot 2\pi/n_c + \epsilon \cdot 2\pi/n_c) \text{ is zero.}$$

The invention is not limited to the characteristics of the example described. A variant will consist in replacing indexing teeth (18–20) of measuring ring gear (12) by a reference point of any type integral with the inertial flywheel, the crankshaft or the camshaft.

Another variant will consist in making measuring ring gear 12 integral with the crankshaft, for example, the toothed target will be mounted on the distribution side.

Still another variant will consist in not individualizing the microprocessor providing the digital calculation functions of measuring circuit 10, but rather in relying either on a relatively powerful microprocessor which already provides the digital calculation functions of the general electronic control system of the vehicle, or on the engine computer. As for analog circuit 26, It will generally be outside the commercially available microprocessors but it can be incorporated into specially adapted ("customized") versions of these microprocessors.

The invention has been described in relation to a particular embodiment which relies on intermediate variables $d_i$, $T_4$ and $D'_4$ and in which the calculations of $d_i$, $T_4$ and $D'_4$ were performed digitally but the calculation of Cg can also be performed by standard analog circuits.

Thus, primary signal 24, whose frequency is modulated by speed variations $\Omega$, contains vector E with frequency $f_i$. To extract vector E and more precisely its projection E cos $\phi$, it is necessary to use a frequency-voltage converter followed by an angular synchronous detector at frequency $f_i$ with a suitable phase. It is then necessary to calculate:

$$Cg = -a \cdot \Omega_m \cdot E \cos\phi + b \cdot \Omega^2_m$$

The invention has been described with reference to a device but it can also be used according to a process which comprises the following main operations:

(a) production of a primary value representative of period $d_i$ of advancement of each of the reference points in front of the sensor;

(b) processing of said primary value ($d_i$) to produce two secondary values respectively representative of average angular velocity $\Omega_m$ on the reference points during a period of the combustions in the engine, and representative of projection E cos $\phi$, on the phase reference line of the reference points relating to the angular combustion periods, of alternating component E of instantaneous angular velocity $\Omega_i$ of the reference points at the frequency of the combustions in the engine;

(c) combination of these two secondary values according to an equation:

$$Cg = -a \cdot \Omega_m \cdot E \cos\phi + b \cdot \Omega^2_m$$

and thus to obtain the desired value, terms a and b being constants determined experimentally.

Further, operation (b), in the case where Cg is a digital value, consists in:

(b1) calculating from $n_c$ primary digital values ($d_i$), a first secondary digital value ($T_k$) representative of the total period of advancement in front of the sensor of each series of ($n_c$) reference points, relating to the angular period of a combustion in the engine, $$\text{with } n_c = (n \cdot t)/(2 \cdot k) \text{ and } T_k = \sum_{o}^{(n_c-1)} d_i$$

(b2) calculating from nc primary digital values $d_i$ and weighting factors cos (i·2π/$n_c$) a second secondary digital value $D_k \cos \phi'_k$ representative of the projection, on a phase reference line of the reference points corresponding to the origin of the angular periods of the combustions, of the amplitude of the alternating component of instantaneous periods $d_i$ of advancement in front of the sensor of the measuring reference points, at the frequency of the combustions in the engine, with $$D_k \cos \phi'_k = (2/n_c) \cdot \sum_{o}^{(n_c-1)} d_i \cdot \cos(i \cdot 2\pi/n_c).$$

Further, operation (c) consists in:

(c1) calculating desired digital value (Cg), defined by the equation $$Cg = A \cdot (D_k \cdot \cos \phi'_k)/T^3_k + B/T^2_k = A \cdot D'_k/T^3_k + B/T^2_k$$

from two secondary digital values $D_k \cos \phi'_k$ and $T_k$ and two constants A and B that are experimentally determined and recorded.

Other operations of the process according to the invention, in particular those corresponding to the grouping of the teeth, to corrections of value Cg as a function of certain operating characteristics of the engine and to different variants are derived in an obvious way from the description of the device and therefore will not be described again.

What is claimed as new and desired to be secured by Letters Patent of the United States is:

1. Device for producing a value representative of average gas torque Cg produced by each combustion of a gas mixture in cylinders of an internal combustion heat engine, comprising:

measuring reference points integrally rotating with one of an inertial flywheel of the engine and a crankshaft of the engine;

means for defining an indexing reference of the reference points;

a stationary sensor sensing advancement of the reference points, said sensor being mounted in the vicinity of the reference points;

means for producing a primary value representative of a period $d_i$ of advancement of each of the reference points in front of the sensor;

means for processing this primary value $d_i$ to produce two secondary values respectively representative of an average angular velocity $\Omega_m$ of the reference points during the combustions in the engine and representative of projection E cos φ on a phase reference line of the reference points with respect to the angular combustion periods, E being an alternating component of an instantaneous angular velocity $\Omega_i$ of the reference points at the frequency of the combustions in the engine; and means for combining said two secondary values according to an equation:

$$Cg = -a \cdot \Omega_m \cdot E \cos \phi + b \cdot \Omega^2_m$$

wherein a and b are constants determined experimentally.

2. Device according to claims 1, mounted on an engine operatable, both at low and high speed, including a ring gear integral with the inertial flywheel, the measuring reference points being formed on said ring gear, and including means for correcting a value of the constant a, as a function of the speed of the engine to provide a term $a_c = a(1-z)$, wherein $z = (fi/fr)^2$, fi is combustion frequency and fr is a stored torsion resonance frequency of the crankshaft and flywheel of the engine.

3. Device for producing a digital value Cg representative of an average gas torque produced by each combustion of a gas mixture in cylinders of an internal combustion heat engine operating at low speed, the engine having t periods per operating cycle and k cylinders, said device comprising:

a number n of real or virtual measuring reference points integrally rotating with one of an inertial flywheel or a crankshaft of the engine;

means for defining at least one indexing reference of the reference points;

a stationary sensor sensing advancement of the reference points, mounted in the vicinity of the reference points;

first calculating means for producing a primary digital value $d_i$ representative of an instantaneous period of advancement in front of sensor of each of the reference points;

second calculating means for producing from $n_c$ primary digital values $d_i$, a first secondary digital value $T_k$ representative of a total period of advancement in front of the sensor of each series of $n_c$ reference points, relating to the angular period of a combustion in the engine, $$\text{wherein } n_c = (n \cdot t)/(2 \cdot k) \text{ and } T_k = \sum_{o}^{(n_c-1)} d_i;$$

third calculating means for producing, from the primary digital value $d_i$ and a weighting factor cos (i·2π/$n_c$) stored in a permanent memory, a second secondary digital value $D_k \cos \phi'_k$ representative of a projection, on a phase reference line of the reference points corresponding to an origin of the angular periods of the combustions, of the amplitude of an alternating component of the instantaneous periods $d_i$ of advancement of the measuring reference points in front of the sensor, at the frequency of the combustions in the engine, with $$D_k \cos \phi'_k = (2/n_c) \cdot \sum_{o}^{(n_c-1)} d_i \cdot \cos(i \cdot 2\pi/n_c); \text{ and}$$

fourth calculating means for producing a desired digital value Cg, defined by the equation $$Cg = A \cdot (D_k \cos \phi'_k)/T^3_k + B/T^2_k = A \cdot D'_k/T^3_k + B/T^2_k$$

from two secondary digital values $D_k \cos \phi'_k$ and $T_k$ and two constants A and B experimentally determined and stored in permanent memories.

4. Device according to one of claims 1 or 3, including a ring gear on the flywheel, the measuring reference points being formed on the ring gear, wherein the measuring reference points are teeth of a ferromagnetic material and the sensor has variable reluctance, additional identical sensors for correcting an error caused by cyclic bending at high engine speeds of the crankshaft and flywheel, wherein a total number M of the sensors with variable reluctance is equal to 2k/t, said sensors being placed uniformly around the ring gear and providing analog output signals, further including a circuit for adding the analog output signals.

5. Device according to claim 3, including a ring gear on the flywheel, the measuring reference points being formed on the ring gear, wherein the measuring reference points are teeth of ferromagnetic material and the sensor has variable reluctance additional identical sensors, for correcting an error caused by the cyclic bending at high engine speeds of the crankshaft and flywheel, wherein a total number M of sensors with variable reluctance is equal to 2k/t, the number M not corresponding to a symmetry of the measuring reference points, as well as means for measuring and for calculating associated with each additional sensor to obtain M values of Cg, and calculating means for producing an algebraic average of the M values.

6. Device according to claim 3, mounted on an engine operatable, both at low and high speed including a ring gear integral with the inertial flywheel, the measuring reference points being formed on said ring gear, and including means for correcting a value of the constant a, as a function of the speed of the engine to provide a term $A_c = A(1-z)$, wherein $z = (fi/fr)^2$, fi is combustion frequency and fr is a stored torsion resonance frequency of the crankshaft and flywheel of the engine.

7. Device according to one of claims 3 or 22, including means for combining, by a whole number m of bundles, each bundle comprising a number of reference points, primary values $d_i$ corresponding to each series of $n_c$ measuring reference points, relating to an angular combustion period in the engine, and for calculating the periods of advancement of each of the bundles past the sensor to produce primary digital values dp, and means for calculating $$D_k \cos \phi'_k = (2/m) \cdot \sum_{o}^{(m-1)} d_p \cdot \cos(p \cdot 2\pi/m)$$

wherein m>2 and $\cos(p \cdot 2\pi/m)$ is a weighting factor stored in a permanent memory.

8. Device according to one of claims 1, 3, 2 or 6, wherein the engine has a lean fuel-air mixture, including further calculating means for correcting the value Cg as a function of a richness (r) of the mixture when r<1 by producing a correction factor $Q_1 = [1 + p_1(r-1)]$, wherein $p_1$ is a constant close to 0.50, and for applying factor $Q_1$ to Cg to provide a corrected digital measuring signal $(Cg)_r = Q_1 \cdot Cg$.

9. Device according to claim 8, wherein the richness r is determined as a function of torque $C_g$ and of the engine speed, and is stored in a permanent memory associated with the further calculating means.

10. Device according to one of claims 2, or 6, wherein, for correcting measurements made in a transition speed of the engine, the third calculating means produces a corrected value:

$$(D'_k)cor. = \frac{2}{n_c} \cdot \sum_{o}^{(n_c-1)} d_i \cdot \cos(i \cdot 2\pi/n_c) + \frac{1}{n_c} \cdot \frac{T_{k,e} - T_{k,(e-1)}}{n_c}$$

with $T_{k,e}$ and $T_{k,(e-1)}$ being the last two calculated values of combustion period $T_k$.

11. Device according to one of claims 2 or 6, wherein, for correcting measurements made in a transition speed of the engine, the third calculating means produces a corrected value:

$$(D'_k)cor. = \frac{2}{n_c} \cdot \sum_{o}^{(n_c-1)} d_i \cos(i \cdot 2\pi/n_c + \epsilon \cdot 2\pi/n_c)$$

with $\epsilon = 0.5$,
wherein weighting factor $\cos(i \cdot 2\pi/n_c + \epsilon \cdot 2\pi/n_c)$ is stored in the permanent memory.

12. Process for producing a value representative of average gas torque Cg produced by each combustion of a gas mixture in cylinders of an internal combustion heat engine including measuring reference points rotating with one of an inertial flywheel and a crankshaft of the engine, means for defining an indexing reference of the reference points, and a stationary sensor for sensing advancement of the reference points, mounted in the vicinity of the measuring reference points, the process comprising the steps of:

(a) producing a primary value representative of a period $d_i$ of advancement of each of the reference points in front of the sensor;

(b) processing said primary value $d_i$ for producing two secondary values respectively representative of average angular velocity $\Omega_m$ on the reference points during a period of the combustions in the engine and representative of a projection $E \cos \phi$ on a phase reference line of the reference points with respect to the angular combustion periods, E being an alternating component of an instantaneous angular velocity $\Omega_i$ of the reference points, at the frequency of the combustions in the engine; and (c) combining said two secondary values according to an equation:

$$Cg = -a \cdot \Omega_m \cdot E \cos \phi + b \cdot \Omega^2_m,$$

a and b being constants determined experimentally.

13. Process according to claim 12 for producing a digital value Cg of an internal combustion heat engine, operating at low speed, said engine comprising t periods per operating cycle and k cylinders and the number of measuring reference points being n, wherein step (b) comprises the following operations:

($b_1$) calculating from $n_c$ primary digital values $d_i$, a first secondary digital value $T_k$ representative of the total period of advancement in front of sensor of each series of $n_c$ reference points relating to the angular period of a combustion in the engine, $$\text{wherein } n_c = (n \cdot t)/(2 \cdot k) \text{ and } T_k = \sum_{o}^{(n_c-1)} d_i$$

($b_2$) calculating from $n_c$ primary digital values $d_i$ and weighting factors $\cos(i \cdot 2\pi/n_c)$ a second secondary digital value $D_k \cos \phi'k$ representative of a projection on a phase reference line of the reference points corresponding to an origin of the angular periods of the combustions, of the amplitude of an alternating component of the instantaneous periods $d_i$ of advancement of the measuring reference points in front of the sensor at the frequency of combustions in the engine, with:

$$D_k \cos\phi'_k = (2/n_c) \cdot \sum_{o}^{(n_c-1)} d_i \cdot \cos(i \cdot 2\pi/n_c).$$

14. Process according to claim 13, wherein step (c) comprises:

calculating desired digital value (Cg), defined by the equation $$Cg = A \cdot (D_k \cdot \cos\phi'_k)/T^3_k + B/T^2_k = A \cdot D'_k/T^3_k + B/T^2_k$$

from two secondary digital values $D_k \cos\phi'_k$ and $T_k$ and two constants A and B that are experimentally determined and recorded.

15. Process according to claim 14, for an engine operating both at low and high speed, including the steps of correcting one of constants a and A as a function of the speed of the engine to one of produce terms $a_c = a(1-z)$ and $Ac = A(1-z)$, wherein $z = (fi/fr)^2$, where fi is the combustion frequency and fr is torsion resonance frequency of the crankshaft and flywheel of the engine.

16. Process according to claim 14, wherein step (a) comprises:

combining, by a whole number m of bundles of reference points, $n_c$ primary digital values $d_i$ corresponding to each series of $n_c$ measuring reference points, relating to an angular combustion period in the engine, and calculating periods of advancement of each of said bundles in front of the sensor to produce m primary digital values $d_p$, and wherein step (b) comprises:

calculating $$D_k \cos\phi'_k = (2/m) \cdot \sum_{o}^{(m-1)} d_p \cdot \cos(p \cdot 2\pi/m),$$

where m>2.

17. Process according to one of claims 12 to 16, for measuring the average gas torque produced by each combustion of a lean fuel-air mixture in the cylinders, comprising the further steps of calculating a correcting value Cg as a function of a richness r of the mixture when r<1, including substeps of:

producing a correction factor $Q_1 = [1 + p_1(r-1)]$, wherein $p_1$ is a constant close to 0.50 and is determined experimentally, and applying $Q_1$ to value Cg for providing a corrected digital value $(Cg)_r = Q_1 \cdot Cg$.

18. Process according to claim 17, including the step of determining a value of richness r by measuring or mapping as a function of torque Cg and of the speed of the engine.

19. Process according to claim 18, including, for correcting measurements made in a transition operation of the engine, the further steps of:

calculating of a corrected value:

$$(D'_k)cor. = \frac{2}{n_c} \cdot \sum_{o}^{(n_c-1)} d_i \cos(i \cdot 2\pi/n_c) + 1 \cdot \frac{T_{k,e}}{n_c} - \frac{T_{k,(e-1)}}{n_c}$$

wherein $T_{k,e}$ and $T_{k,(e-1)}$ are the last two calculated values of period of combustions $T_k$.

20. Process according to claim 18, including for correcting measurements made in a transition speed of the engine, the further steps of:

calculating a corrected value:

$$(D'_k)cor. = \frac{2}{n_c} \cdot \sum_{o}^{(n_c-1)} d_i \cos(i \cdot 2\pi/n_c + \epsilon \cdot 2\pi/n_c)$$

with $\epsilon = 0.5$.

21. Process according to one of preceding claims 12 to 16, wherein the measuring reference points are teeth of ferromagnetic material of a ring gear and the sensor has variable reluctance, for correcting an error caused by cyclic bending at high engine speeds of the crankshaft and flywheel including the further steps of:

uniformly placing a total number M=2k/t of identical sensors with variable reluctance around the ring gear;

adding signals provided by the M sensors for obtaining a signal independent of the bending; and using the added signals for the measurement of the primary value.

22. Process according to one of the preceding claims 12 to 16, wherein, the measuring reference points are teeth of ferromagnetic material of a ring gear and the sensor has variable reluctance, for correcting an error caused by the crankshaft and flywheel cyclic bending, said process further comprises the steps of:

uniformly placing a total number M=2k/t of identical sensors with variable reluctance around the ring gear, number M not corresponding to a symmetry of the measuring reference points;

calculating M values of Cg from signals provided by said M identical sensors; and calculating an algebraic average value of the M values of Cg.

* * * * *